US012383457B1

(12) United States Patent
Zhao et al.

(10) Patent No.: US 12,383,457 B1
(45) Date of Patent: Aug. 12, 2025

(54) INTERNAL SUCKING MASSAGE STICK STRUCTURE

(71) Applicants: Dongguan Rijie Electronic Technology Co., Ltd., Guangdong (CN); Shenzhen Envision Technology Innovation Co., Ltd., Guangdong (CN)

(72) Inventors: Quan Zhao, Guangdong (CN); Lang Cun, Guangdong (CN)

(73) Assignee: Dongguan Rijie Electronic Technology Co., Ltd., Guangdong (CN)

( * ) Notice: Subject to any disclaimer, the term of this patent is extended or adjusted under 35 U.S.C. 154(b) by 0 days.

(21) Appl. No.: 18/911,380

(22) Filed: Oct. 10, 2024

(51) Int. Cl.
*A61H 19/00* (2006.01)
*A61H 9/00* (2006.01)
*A61H 23/02* (2006.01)

(52) U.S. Cl.
CPC ........... *A61H 19/44* (2013.01); *A61H 9/0057* (2013.01); *A61H 23/0254* (2013.01); *A61H 2201/0153* (2013.01); *A61H 2201/1215* (2013.01); *A61H 2201/1238* (2013.01); *A61H 2201/169* (2013.01)

(58) Field of Classification Search
CPC ........ A61H 19/00; A61H 19/40; A61H 19/44; A61H 19/50; A61H 9/0057; A61H 9/0078; A61H 23/0254; A61H 2201/0153; A61H 2201/1215; A61H 2201/1238; A61H 2201/169
See application file for complete search history.

(56) References Cited

FOREIGN PATENT DOCUMENTS

CN 209611719 U 11/2019

*Primary Examiner* — Carrie R Dorna
(74) *Attorney, Agent, or Firm* — Rondaus PLLC; George Liu

(57) ABSTRACT

An internal sucking massage stick structure, includes a hard shell, a flexible wall and a driving apparatus, the hard shell is provided with an inner cavity, the inner cavity is provided with at least one concave part penetrating through the side wall of the hard shell, the flexible wall covers the peripheral wall of the hard shell, the flexible wall shields the concave part to form an elastic part, a closed cavity is defined between the elastic part and the hard shell, the driving apparatus is disposed in the inner cavity, the inner cavity is provided with a lithium battery, a PCB connected with the lithium battery and a control apparatus connected with the PCB, the driving apparatus is connected with the PCB, the control apparatus is configured to control the working state of the driving apparatus; the driving apparatus is configured to control volume change of the closed cavity.

20 Claims, 7 Drawing Sheets

INTERNAL SUCKING MASSAGE STICK STRUCTURE

TECHNICAL FIELD

The present application relates to the field of sexual articles, in particular to an internal sucking massage stick structure.

BACKGROUND

An existing massage stick mainly performs local stimulation on sensitive points of women, so that preset mental pleasure is obtained. However, the existing massage stick generally mainly adopts a single vibration motor to stimulate, the stimulation mode is single, and novelty may be lost after it is used for a period of time, so that the use experience is influenced.

Of course, some sexual articles stimulate the sensitive points by a swinging simulated tongue, but it mainly acts on the peripheral sensitive points of the vagina and cannot extend into the vagina, so that the use experience is influenced.

SUMMARY

A main objective of the present application is to provide an internal sucking massage stick structure, aiming at improving the structure of a massage stick, so that it may extend into the vagina and may also act on the opening of the vagina, and multi-level stimulation on sensitive points of the vagina is realized through an internal sucking structure, thereby improving use experience.

In order to realize the purpose, the present application provides an internal sucking massage stick structure, which includes a hard shell, a flexible wall and a driving apparatus.

The hard shell is provided with an inner cavity, and the inner cavity is provided with at least one concave part penetrating through the side wall of the hard shell.

The flexible wall covers the peripheral wall of the hard shell, the flexible wall shields the concave part to form an elastic part, and a closed cavity is defined between the elastic part and the hard shell.

The driving apparatus is disposed on the hard shell, the hard shell is provided with a lithium battery, a PCB connected with the lithium battery and a control apparatus connected with the PCB, the driving apparatus is connected with the PCB, and the control apparatus is configured to control the working state of the driving apparatus.

The driving apparatus is configured to control volume change of the closed cavity and adjust air pressure inside.

When air pressure changes, the elastic part may deform between an expansion position and a retraction position.

In actual design, the massage stick includes a hard shell and a flexible wall covering the hard shell, therefore, the massage stick is preferably in a strip shape (such as a long strip column-shaped structure, an elliptic column-shaped structure, or a round ball shape), the massage stick may extend into the vagina and may also be on the opening of the vagina, in use, the driving apparatus may control air pressure change of the closed cavity, so as to apply preset stimulation on the opening of the vagina (such as the clitoris) or the vaginal wall, and the simulation may be elastic touch of the elastic part to skin and also may be negative pressure adsorbing touch (which may be understood as sucking), so that sensitive points of different positions are stimulated for obtaining different experiences, and meanwhile, the touch of simulated expanding of penis of the massage stick may be experienced.

Figure 1:
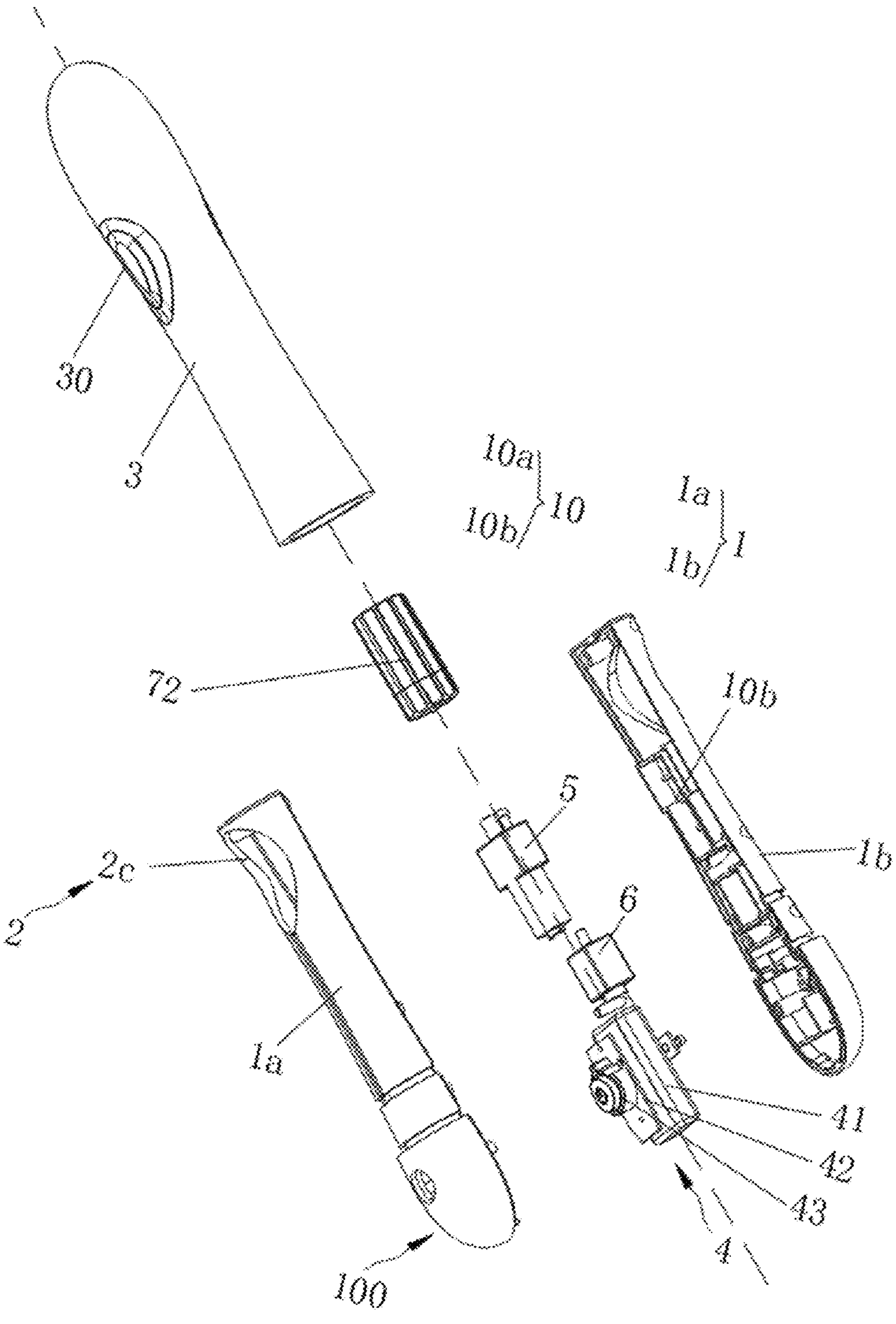
FIG. 1 is a schematic diagram I of an exploded view of the present application.
Figure 2:
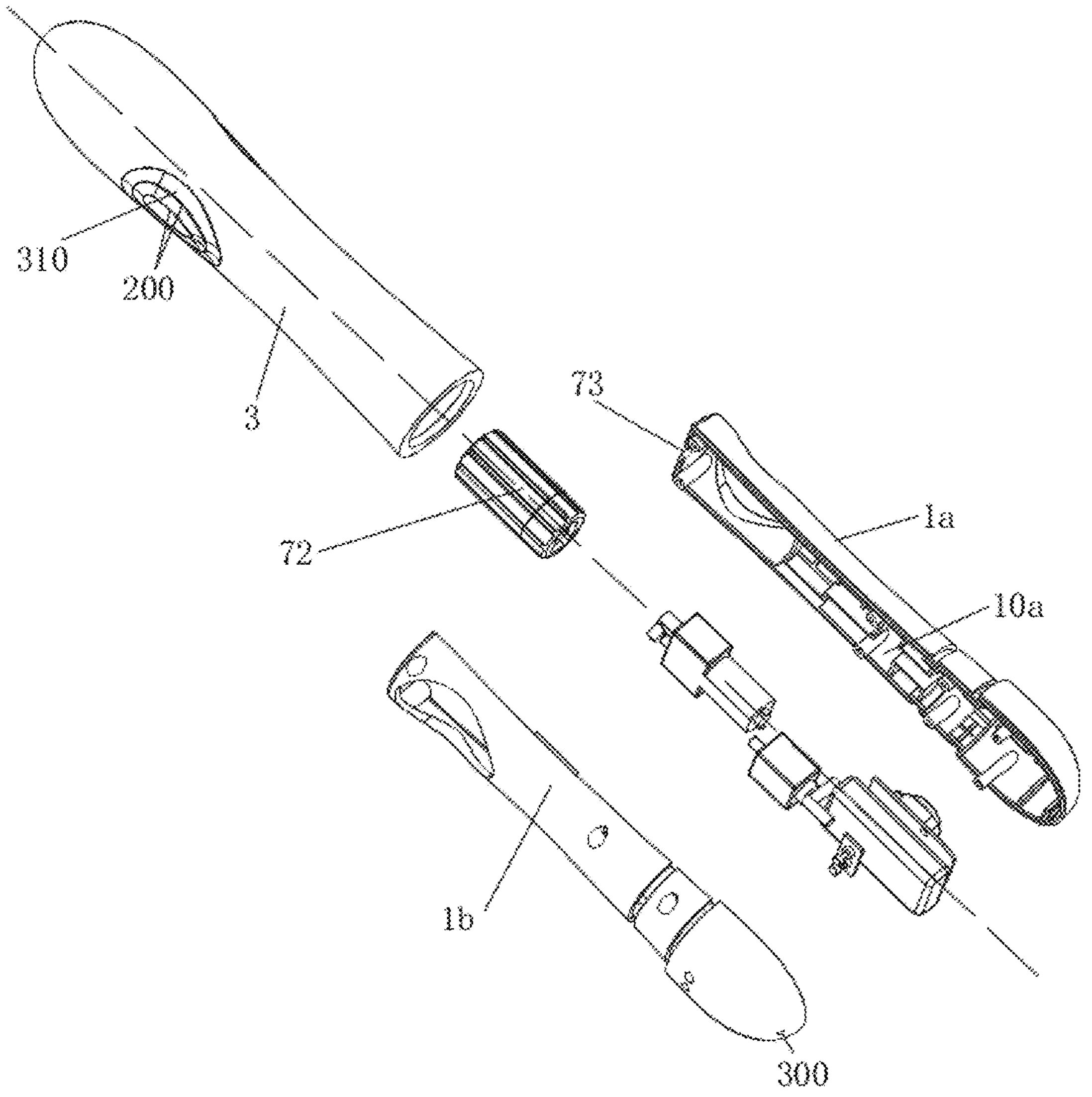
FIG. 2 is a schematic diagram II of an exploded view of the present application.

1. Hard shell, 10. Inner cavity, 10*a*. First half groove, 10*b*. Second half groove, 11. First cavity, 12. Second cavity, 1*a*. First side shell, 1*b*. Second side shell, 1*c*. Partition plate, 10*c*. First partition part, 11*c*. Second partition part.

2. Concave part, 2*a*. Concave are, 2*b*. Solid wall, 2*c*. Through hole, 2*d*. Hole position,

3. Flexible wall, 30. Elastic part, 3*a*. Closed cavity, 310. Annular part,

4. Driving apparatus, 41. Lithium battery, 42. PCB, 43. Control apparatus,

5. Air pump, 51. First fluid passage, 51*a*. Second air inlet, 51*b*. Exchange air opening,

52. Second fluid passage,

6. Three-way solenoid valve, 61. First air valve, 62. Second air valve, 63. Third air valve,

7. Solid part, 71. Third cavity, 72. Vibration motor, 73. Through hole,

8. Limiting hole,

91. Limiting groove, 92. Limiting part,

100. Holding part,

200. Massage pattern, and 300. First air inlet.

DETAILED DESCRIPTION OF THE EMBODIMENTS

The technical solutions in the embodiments of the present application will be clearly and completely described below in combination with the drawings, and it is apparent that the described embodiments are not all but part of the embodiments of the present application. All other embodiments obtained by those of ordinary skill in the art on the basis of the embodiments in the present application without creative work shall fall within the scope of protection of the present application.

It is to be noted that if the embodiments of the present application contain directional indications (such as up, down, left, right, front, back, top, bottom, inside, outside, vertical, transverse, longitudinal, counterclockwise, clockwise, circumferential, radial, axial . . . ), the directional indications are only used to explain the relative position relationship and motion between the components under a specific attitude (as shown in the attached figures) If the specific attitude changes, the directional indication may change accordingly.

In addition, if there is a description of "first" or "second" in the embodiments of the present application, the description of "first" or "second" is only adopted for description and should not be understood to indicate or imply relative importance or implicitly indicate the number of indicated technical features Therefore, a feature defined by "first" and "second" may explicitly or implicitly indicate inclusion of at least one such feature. In addition, the technical solutions among the embodiments can be combined with each other, but must be based on implementation of those of ordinary skill in the art. When the combination of technical solution is contradictory or impossible to implement, it shall be considered that such combination of the technical solution does not exist and is not within the scope of protection of the present application.

As shown in FIGS. 1-6, an internal sucking massage stick structure includes: a hard shell 1, a flexible wall 3 and a driving apparatus 4.

The hard shell 1 is provided with an inner cavity 10, and the inner cavity 10 is provided with at least one concave part 2 penetrating through the side wall of the hard shell 1.

The flexible wall 3 covers the peripheral wall of the hard shell 1, the flexible wall 3 shields the concave part 2 to form an elastic part 30, and a closed cavity 3*a* is defined between the elastic part 30 and the hard shell 1.

The driving apparatus 4 is disposed on the hard shell 1, the hard shell 1 is provided with a lithium battery 41, a PCB 42 connected with the lithium battery 41 and a control apparatus 43 connected with the PCB 42, the driving apparatus 4 is connected with the PCB 42 and the control apparatus 43 is configured to control the working state of the driving apparatus 4.

The driving apparatus 4 is configured to control volume change of the closed cavity 3*a* and adjust air pressure inside.

When air pressure changes, the elastic part 30 may deform between an expansion position and a retraction position.

In actual design, the massage stick includes a hard shell 1 and a flexible wall 3 covering the hard shell 1, therefore, the massage stick is preferably in a strip shape (such as a long strip column-shaped structure, an elliptic column-shaped structure, or a round ball shape), the massage stick may extend into the vagina and may also be on the opening of the vagina, in use, the driving apparatus 4 may control air pressure change of the inner cavity 10, so as to apply preset stimulation on the opening of the vagina (such as the clitoris) or the vaginal wall, and the simulation may be elastic touch of the elastic part 30 to skin and also may be negative pressure adsorbing touch (which may be understood as sucking), so that sensitive points of different positions are stimulated for obtaining different experiences, and meanwhile, the touch of simulated expanding of penis of the massage stick may be experienced.

In actual design, due to coordination of the hard shell 1 and the flexible wall 3, a closed cavity is formed inside the massage stick, air pressure change of the closed cavity 3*a* is realized through the driving apparatus 4, in a preferred embodiment, the hard shell 1 is provided with a first air inlet 300, and opening or closing of the first air inlet 300 is controlled through a third valve, so as to realize expanding of the elastic part 30.

The concave part 2 is a through hole, the through hole penetrates through the side wall of the hard shell 1, in such a case, the deformation degree and production of the clastic part 30 are relatively convenient, and the production cost is low.

The concave part 2 extends in an are from the hard shell 1 toward the axis and forms an arc-shaped solid wall 2*b*, the concave part 2 is provided with a hole position 2*d* communicating with the driving apparatus 4, and in such a case, the closed cavity 3*a* may be located between the solid wall 2*b* and the elastic part 30, or also may be located in the closed cavity 3*a*.

The driving apparatus 4, the lithium battery 41, the PCB 42 and the control apparatus 43 may be disposed in the inner cavity 10, and also may be disposed at positions (such as outer wall and bottom), away from the inner cavity 10, of the hard shell 1, so as to realize fixing.

Of course, the closed cavity 3*a* may also be disposed between the elastic part 30 and the outer wall of the concave part 2, and the closed cavity 3*a* is directly driven by the driving apparatus 4.

Figure 3:
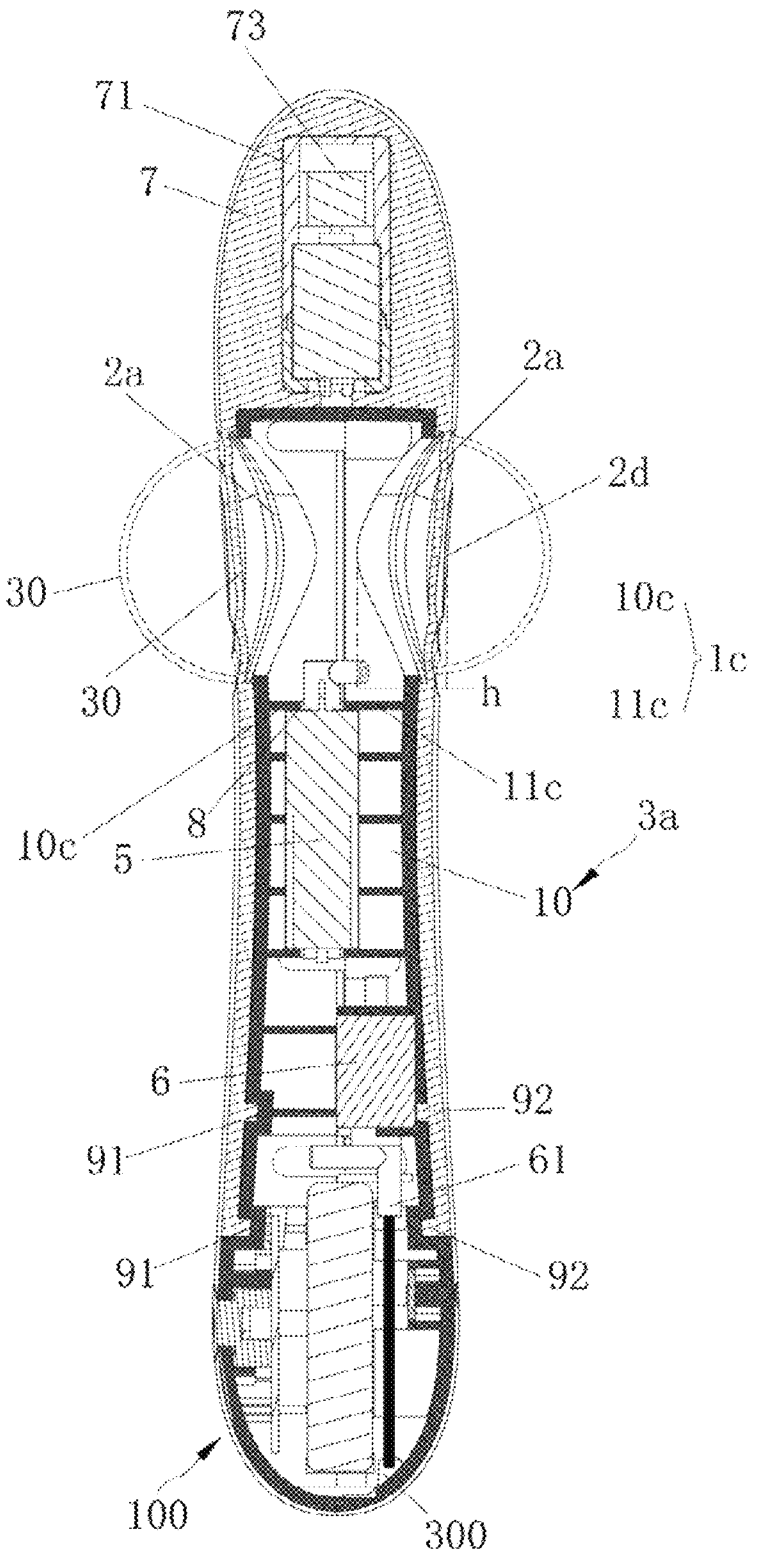
FIG. 3 is a schematic diagram of a sectional view of the present application.

As shown in FIG. 3, the inner cavity 10 and the elastic part 30 define the closed cavity 3*a*, namely, the inner cavity 10 is the closed cavity 3*a*.

Figure 4:
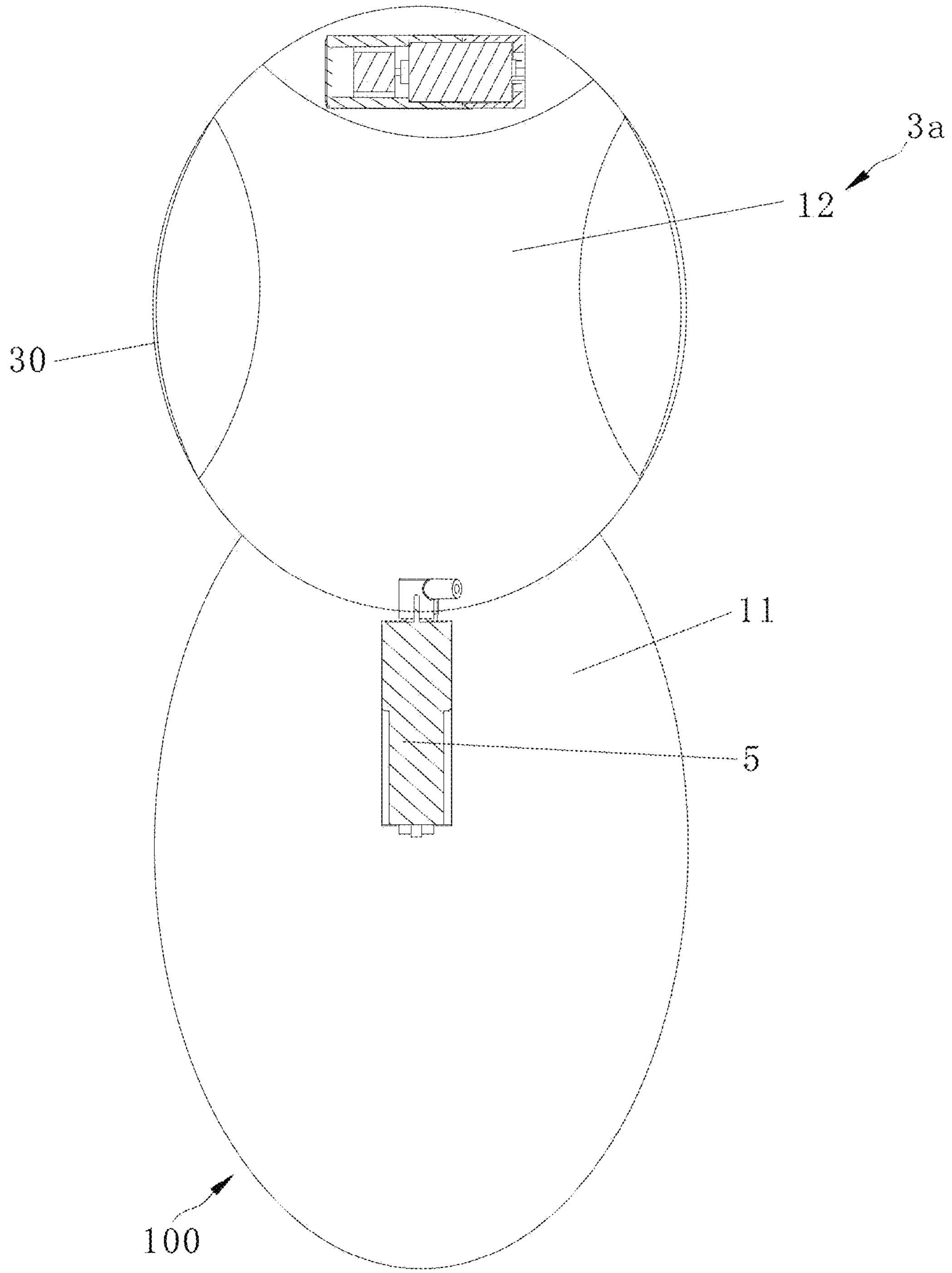
FIG. 4 is a schematic diagram when the present application is composed of two connected spheroids.
Figure 5:
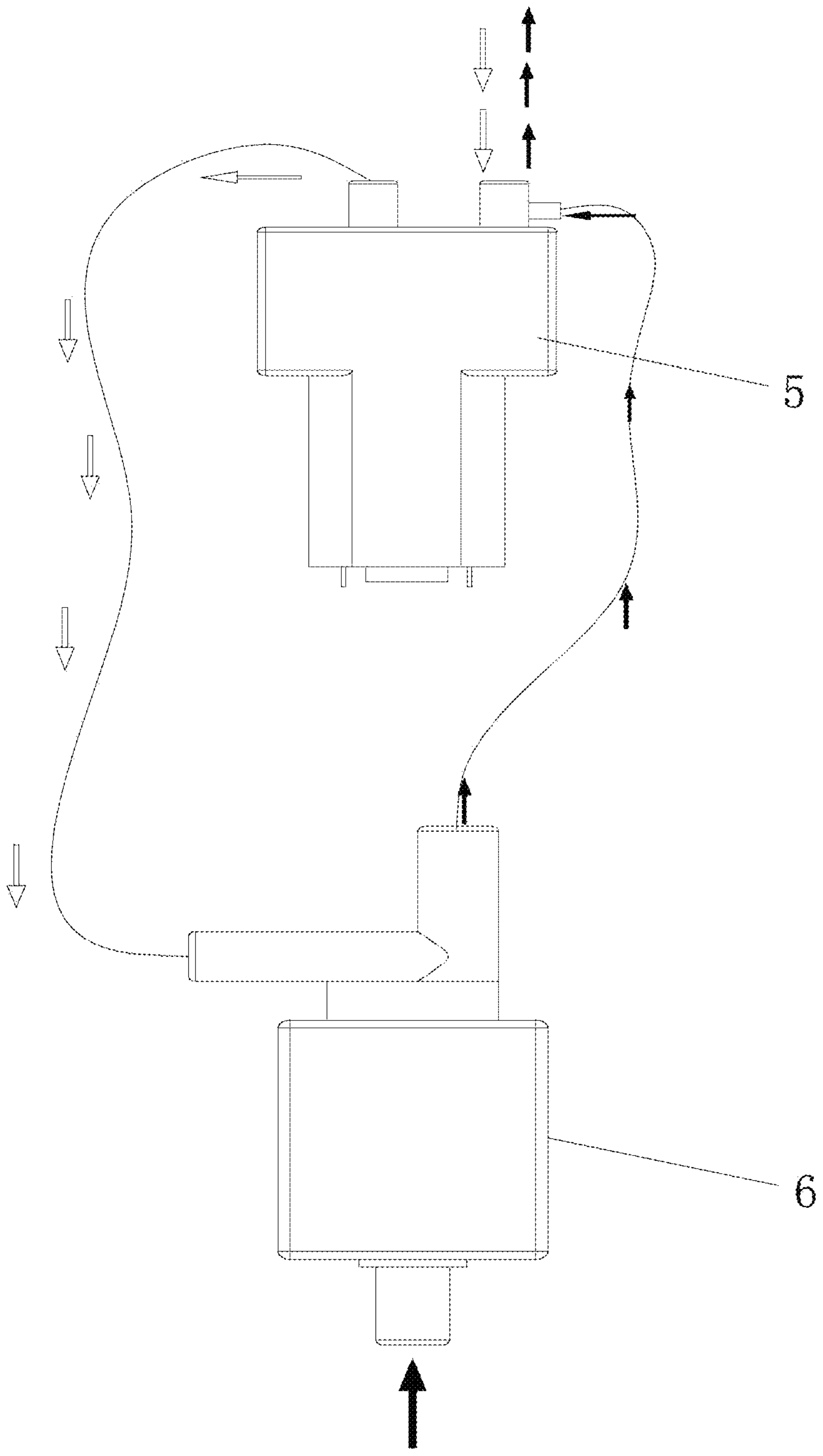
FIG. 5 is a schematic diagram of a plan view of a driving apparatus.
Figure 6:
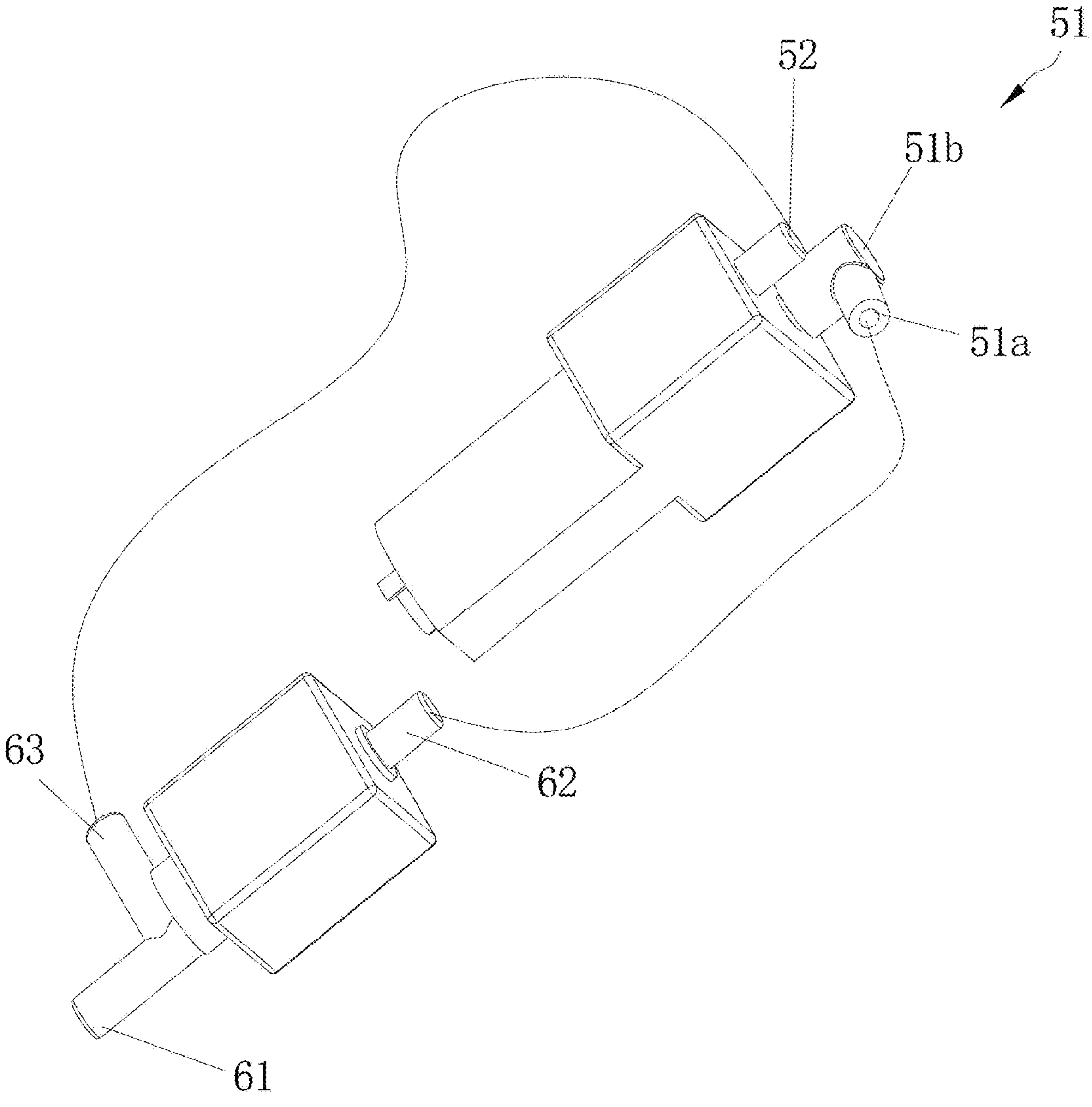
FIG. 6 is a schematic diagram of coordination of a driving apparatus.

As shown in FIG. 4, the second cavity 12 is the closed cavity 3*a*.

Figure 7:
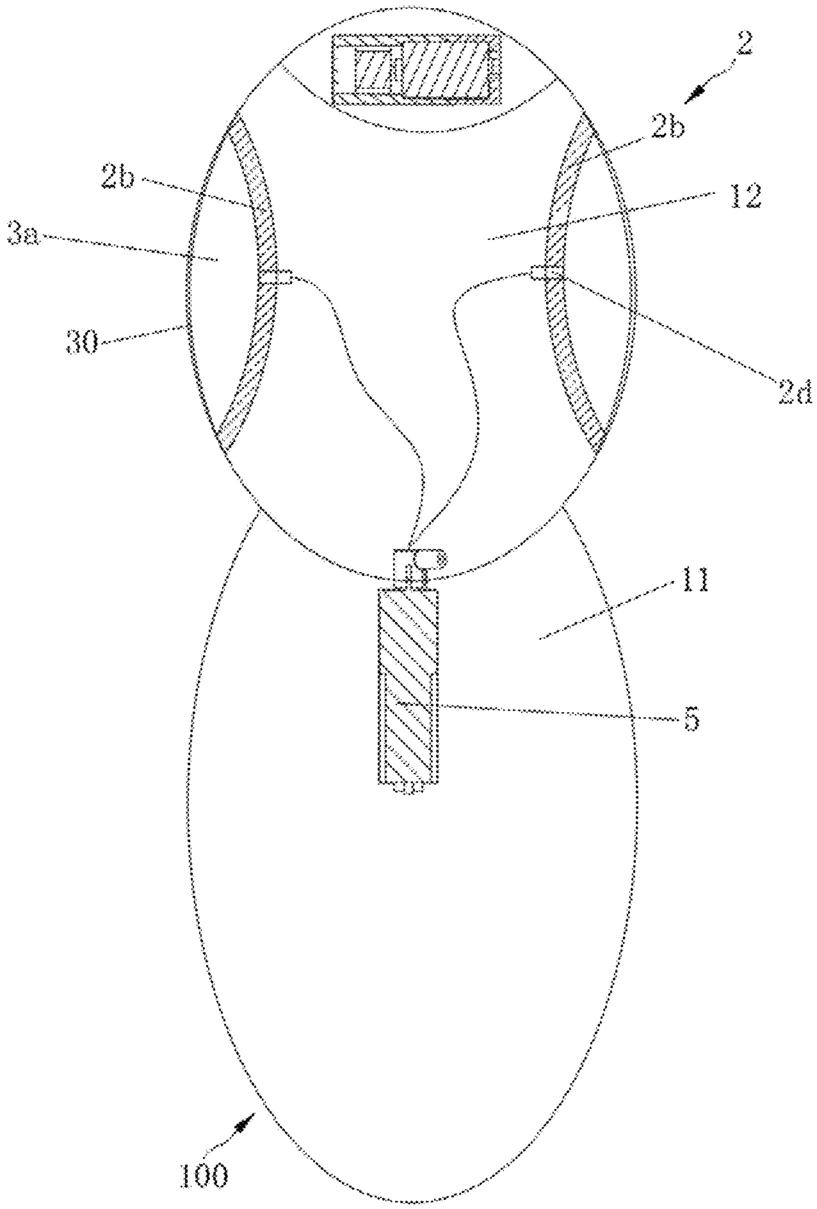
FIG. 7 is a schematic diagram when a concave part is a solid wall. In the drawings.

As shown in FIG. 7, when the solid wall 2*b* and the elastic part 30 define the closed cavity 3*a*, the driving apparatus 4 directly controls volume change of the closed cavity 3*a* through the hole position 2*d*.

In another embodiment, the inner cavity 10 is separated into relatively independent first cavity 11 and second cavity 12 by a partition plate 1*c*, thereby realizing separate air pressure change of the second cavity 12. When the second cavity 12 is a separate closed cavity 3*a*, an air inlet 51*a* and an exchange air opening 51*b* are located in the second cavity 12.

Of course, the elastic part 30 may also be a sheet structure disposed separately in the concave part 2, deformation of the elastic part 30 may also be realized, however, the sealing property and use flexibility of the elastic part 30 will be affected.

Specifically, the outer side wall at the position of the concave part 2 extends in an arc towards two sides, it may be understood as that height h is larger, then the deformation interval of the elastic part 30 becomes larger therewith correspondingly, then stimulation for a sensitive area of the female is improved, and the sucking amplitude is also larger.

The main reason is that, the vaginal wall may attach to the elastic part 30, so when the elastic part 30 is concave, it will produce negative pressure with the vaginal wall, and then adsorb the vaginal wall, so that the stimulation effect is improved.

Specifically, the cross section of the concave part 2 is in the shape of a concave arc 2*a*.

Specifically, the concave part 2 is a through hole 2*c* disposed in a penetrating mode, of course, specifically, the concave part 2 may also be a through hole 2*c* disposed in a penetrating mode which may realize corresponding touch and stimulation, but the deformation amplitude is small, and then the sensory stimulation is also small.

Specifically, the concave part 2 is of a block structure, a strip structure or a point structure, of course, in specific design, the concave part 2 may be disposed as different shapes according to the actual needs, and its deformation degree will also change accordingly. In the present application, the block structure is adopted, and it is elliptic.

Specifically, the hard shell 1 is integrally injection-molded from plastic, including a partition plate 1*c* and a concave part 2, so its integrity will be better.

Specifically, two concave parts 2 are available, of course, specifically, three concave parts may also be available, so that different adsorbing effects are formed.

Specifically, the two concave parts 2 are disposed on the peripheral wall of the hard shell 1 symmetrically.

Specifically, the driving apparatus 4 includes an air pump 5 and a three-way solenoid valve 6, the air pump 5 is provided with a first fluid passage 51 and a second fluid passage 52, the three-way solenoid valve 6 is provided with a first air valve 61, a second air valve 62 and a third air valve 63, and the first fluid passage 51 includes a second air inlet 51*a* and an exchange air opening 51*b*.

The exchange air opening 51*b* communicates with the inner cavity 10.

The second air inlet 51*a* communicates with the second air valve 62, the first air valve 61 communicates with outside of the hard shell 1, and the third air valve 63 communicates with the second fluid passage 52.

In actual use, the air pump 5 delivers preset fluid to the inner cavity 10 through the first air valve 61, so that the elastic part 30 deforms towards an expanding position, then the first air valve 61 is closed, then the air pup 5 delivers the fluid to the third air valve 63 through the second fluid passage 52 from the exchange air opening 51*b* (in such a case, the elastic part 30 is in a contraction state), and then delivers the fluid to the inner cavity 10 through the three-way solenoid valve 6, in such a case, it is in an expanding state.

Switching between positive air pressure and negative air pressure is realized, and volume switching of the closed cavity 3*a* is realized.

Specifically, a solid part 7 extends from the upper end of the flexible wall 3, a third cavity 71 is disposed on the solid part 7, and the third cavity 71 is provided with a vibration motor 72.

A through hole 73 is disposed on the top wall of the hard shell 1, a cable passes through the through hole 73 and then is connected with the PCB 42 along the side wall of the inner cavity 10, and different senses of stimulation may be provided for the sensitive area through the vibration motor 72, so that the use experience is improved.

Specifically, the hard shell 1 includes a first side shell and a second side shell 1*b* which are matched with each other, the first side shell 1*a* and the second side shell 1*b* are provided with a first half groove 10*a* and a second half groove 10*b* respectively, and a first partition part 10*c* and a second partition part Ile are disposed on inner walls of the first side shell 1*a* and the second side shell 1*b*, respectively.

The first partition part 10*c* and the second partition part 11*c* define a partition plate 1*c*, and the partition plate 1*e* separates inside of the hard shell 1 into a first cavity 11 and a second cavity 12, so that division of the first cavity 11 and the second cavity 12 is realized.

Specifically, the partition plate 1*e* is provided with a limiting hole 8 for the first fluid passage 51 and the second fluid passage 52 of the air pump 5 to extend into, and preferably, the limiting hole 8 and the air pump 5 are disposed in an airtight mode.

Specifically, the vibration motor 72 is disposed horizontally or vertically, and the placement direction of the vibration motor is further changed according to different products.

Specifically, at least one limiting groove 91 is concavely disposed on the lower peripheral wall of the hard shell 1, the flexible wall 3 is provided with a limiting part 92 matched with the limiting groove 91, so that stable mounting of the flexible wall 3 is guaranteed, and the bonding degree and sealing performance are guaranteed.

Specifically, the flexible wall 3 is an integrally injection-molded silica gel layer, of course, specifically, the flexible wall 3 may also be a condom.

Specifically, the lower part of the hard shell 1 is a holding part 100, so that use of the massage stick is facilitated.

Specifically, a massage pattern 200 is disposed on the outer wall of the elastic part, and the massage pattern is of a concave structure or a convex structure.

Specifically, the massage pattern is disposed in a point shape, a strip shape or a pattern shape, so that recognition for the sensitive point and use are facilitated, and stimulation for the sensitive point is improved.

Specifically, the hard shell 1 is of a long strip structure or is composed of two connected spheroids.

The elastic part 30 is provided with a plurality of annular parts 310 disposed at intervals, and the annular parts 310 are concavely disposed on the outer wall of the elastic part 30, so as to provide preset deformation direction and deformation interval, which may be understood as a folding position, thereby realizing controllability of deformation.

The above description is preferred embodiments of the present application, and is not intended to limit the scope of the present application, under the invention concept of the present application, the equivalent structural transformation performed by using the contents of the specification and the drawings of the present application, or directly or indirectly applied to other related technical fields, are included in the scope of the present application.

What is claimed is:

1. An internal sucking massage stick structure, comprising:

a hard shell, which is provided with an inner cavity, and at least one concave part is disposed on the side wall of the hard shell;

a flexible wall, which covers a peripheral wall of the hard shell, the flexible wall shields each of the at least one concave part to respectively form an elastic part, and a respective closed cavity is defined between each of the respective elastic parts and the hard shell;

a pneumatic actuator, which is disposed on the hard shell, the hard shell is provided with a lithium battery, a Printed Circuit Board (PCB) connected with the lithium battery and a control unit connected with the PCB, the pneumatic actuator is connected with the PCB, and the control unit is configured to control the working state of the pneumatic actuator;

the pneumatic actuator is configured to control a volume change of each of the respective closed cavities and adjust air pressure inside each of the respective closed cavities, when air pressure changes, the each of the respective elastic parts may deform between an expansion position and a retraction position.

2. The internal sucking massage stick structure as claimed in claim 1, wherein an outer side wall at the position of the at least one concave part extends in an arc towards two sides, and the cross section of the at least one concave part is in the shape of a concave arc.

3. The internal sucking massage stick structure as claimed in claim 1, wherein the at least one concave part is a through hole, and the through hole penetrates through the side wall of the hard shell.

4. The internal sucking massage stick structure as claimed in claim 1, wherein the at least one concave part extends in an arc from the hard shell toward an axis, the concave part forms an arc-shaped solid wall, and the concave part is provided with a hole position communicated with the pneumatic actuator.

5. The internal sucking massage stick structure as claimed in claim 1, wherein the inner cavity and each of the respective elastic parts define each of the respective closed cavities.

6. The internal sucking massage stick structure as claimed in claim 1, wherein the hard shell comprises a first side shell and a second side shell which are matched with each other, the first side shell and the second side shell are provided with a first half groove and a second half groove respectively, and the first half groove and the second half groove define the inner cavity.

7. The internal sucking massage stick structure as claimed in claim 1, wherein a first partition part is disposed on the inner wall of the first side shell, a second partition part is disposed on the inner wall of the second side shell, the first partition part and the second partition part define a partition plate, and the partition plate separates inside of the hard shell into a first cavity and a second cavity.

8. The internal sucking massage stick structure as claimed in claim 1, wherein the at least one concave part is available; and the at least one concave part is disposed on the peripheral wall of the hard shell symmetrically.

9. The internal sucking massage stick structure as claimed in claim 1, wherein the pneumatic actuator comprises an air pump and a three-way solenoid valve, the air pump is provided with a first fluid passage and a second fluid passage, the three-way solenoid valve is provided with a first air valve, a second air valve and a third air valve, the first fluid passage comprises a second air inlet and an exchange air opening, the exchange air opening is disposed at the position of the inner cavity, the second air inlet communicates with the second air valve, the first air valve communicates with outside of the hard shell, and the third air valve communicates with the second fluid passage.

10. The internal sucking massage stick structure as claimed in claim 9, wherein the inner cavity is provided with a partition plate, the partition plate separates the inner cavity into independent first and second cavities, the second cavity is provided with a concave part, and the second cavity is each of the respective closed cavities.

11. The internal sucking massage stick structure as claimed in claim 10, when the solid wall and the elastic part define the closed cavity, the driving apparatus directly controls volume change of the closed cavity by the hole position.

12. The internal sucking massage stick structure as claimed in claim 10, wherein when the second cavity is a separate closed cavity, the second air inlet and the exchange air opening are located in the second cavity.

13. The internal sucking massage stick structure as claimed in claim 10, wherein a solid part extends from the upper end of the flexible wall, a third cavity is disposed on the solid part, the third cavity is provided with a vibration motor, a through hole is disposed on a top wall of the hard shell, a cable passes through the through hole and then is connected with the PCB along the side wall of the second cavity;

the vibration motor is disposed horizontally or vertically.

14. The internal sucking massage stick structure as claimed in claim 10, wherein the partition plate is provided with a limiting hole for locating an end part of the air pump.

15. The internal sucking massage stick structure as claimed in claim 1, wherein at least one limiting groove is concavely disposed on a lower peripheral wall of the hard shell, and the flexible wall is provided with a limiting part matched with the at least one limiting groove.

16. The internal sucking massage stick structure as claimed in claim 1, wherein the flexible wall is an integrally injection-molded silica gel layer.

17. The internal sucking massage stick structure as claimed in claim 1, wherein a lower part of the hard shell is a holding part.

18. The internal sucking massage stick structure as claimed in claim 1, wherein a massage pattern is disposed on an outer wall of each of the respective elastic parts, and the massage pattern is of a concave structure or a convex structure; and the massage pattern is disposed in a point shape, a strip shape or a pattern shape.

19. The internal sucking massage stick structure as claimed in claim 1, wherein the hard shell is of a long strip structure or is composed of two connected spheroids.

20. The internal sucking massage stick structure as claimed in claim 1, wherein each of the respective elastic parts is provided with a plurality of annular parts disposed at intervals, and the annular parts are concavely disposed on an outer wall of each of the respective elastic parts.

* * * * *